United States Patent
Manning et al.

(10) Patent No.: US 9,274,973 B2
(45) Date of Patent: *Mar. 1, 2016

(54) MEMORY ADDRESS TRANSLATION

(71) Applicant: Micron Technology, Inc., Boise, ID (US)

(72) Inventors: Troy A. Manning, Meridian, ID (US); Martin L. Culley, Boise, ID (US); Troy D. Larsen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/269,445

(22) Filed: May 5, 2014

(65) Prior Publication Data

US 2014/0297990 A1   Oct. 2, 2014

Related U.S. Application Data

(63) Continuation of application No. 13/859,502, filed on Apr. 9, 2013, now Pat. No. 8,898,424, which is a continuation of application No. 12/985,787, filed on Jan. 6, 2011, now Pat. No. 8,417,914.

(51) Int. Cl.
*G06F 12/00* (2006.01)
*G06F 12/10* (2006.01)
*G06F 12/02* (2006.01)

(52) U.S. Cl.
CPC ........ *G06F 12/1045* (2013.01); *G06F 12/0246* (2013.01); *G06F 12/1009* (2013.01);
(Continued)

(58) Field of Classification Search
CPC ................ G06F 12/0246; G06F 2212/7201
See application file for complete search history.

(56) References Cited

U.S. PATENT DOCUMENTS 6,282,624 B1 * 8/2001 Kimura ............... G06F 12/0246
                                                            711/103
6,898,669 B2    5/2005 Tomita
(Continued)

FOREIGN PATENT DOCUMENTS

| CN | 1276358     | 9/2006  |
|----|-------------|---------|
| JP | H11-203191  | 7/1999  |
| JP | 2003-186628 | 4/2003  |
| JP | 2003-150443 | 5/2003  |
| JP | 2006-338371 | 12/2006 |
| TW | 564346      | 12/2003 |

OTHER PUBLICATIONS

Notice of Rejection for related Japan Patent Application No. 2013-548536, dated Jul. 29, 2014, 4 pages.

(Continued)

*Primary Examiner* — Shawn X Gu
(74) *Attorney, Agent, or Firm* — Brooks, Cameron & Huebsch, PLLC

(57) ABSTRACT

The present disclosure includes devices, systems, and methods for memory address translation. One or more embodiments include a memory array and a controller coupled to the array. The array includes a first table having a number of records, wherein each record includes a number of entries, wherein each entry includes a physical address corresponding to a data segment stored in the array and a logical address. The controller includes a second table having a number of records, wherein each record includes a number of entries, wherein each entry includes a physical address corresponding to a record in the first table and a logical address. The controller also includes a third table having a number of records, wherein each record includes a number of entries, wherein each entry includes a physical address corresponding to a record in the second table and a logical address.

14 Claims, 5 Drawing Sheets

(52) U.S. Cl.
CPC ........ *G06F 12/1027* (2013.01); *G06F 12/0292* (2013.01); *G06F 2212/1004* (2013.01); *G06F 2212/7201* (2013.01); *Y02B 60/1225* (2013.01)

(56) References Cited

U.S. PATENT DOCUMENTS

| | | | |
|---|---|---|---|
| 6,938,144 | B2 | 8/2005 | Toyama et al. |
| 7,248,493 | B2 | 7/2007 | Takashima et al. |
| 2003/0115414 | A1 | 6/2003 | Tomita |
| 2004/0186946 | A1 | 9/2004 | Lee |
| 2007/0143569 | A1 | 6/2007 | Sanders et al. |
| 2008/0320214 | A1 | 12/2008 | Ma et al. |
| 2009/0132755 | A1 | 5/2009 | Radke |
| 2009/0182973 | A1 | 7/2009 | Greiner et al. |
| 2009/0193184 | A1 | 7/2009 | Yu et al. |
| 2009/0198902 | A1 | 8/2009 | Khmelnitsky et al. |
| 2010/0030999 | A1 | 2/2010 | Hinz |
| 2010/0217927 | A1 | 8/2010 | Song et al. |
| 2012/0239855 | A1* | 9/2012 | Tootoonchian et al. ...... 711/103 |

OTHER PUBLICATIONS

Office Action for related China Patent Application No. 201280004871.X, dated Apr. 10, 2015, 12 pages.

European Search Report and Written Opinion for related EP Patent Application No. 12732390.5, dated Jun. 4, 2014, 7 pages.

Gupta, et al., DFTL: A Flash Translation Layer Employing Demand-based Selective Caching of Page-level Address Mappings, ASPLOS'09, Mar. 7-11, 2009, Washington, DC, USA (12 pgs.).

Karedla, et al., Caching Strategies to Improve Disk System Performance, IEEE Transactions on Computer, 27(3):38-46, Mar. 1994 (9pgs.).

International Search Report and Written Opinion for related PCT Application No. PCT/US2012/020312, mailed Jul. 31, 2012, (9 pages).

Office Action from related Taiwan Patent Application No. 101100720, dated Jan. 29, 2014, 7 pages.

* cited by examiner

MEMORY ADDRESS TRANSLATION

PRIORITY INFORMATION

This application is a Continuation of U.S. application Ser. No. 13/859,502, filed on Apr. 9, 2013 and issued as U.S. Pat. No. 8,898,424 on Nov. 25, 2014, which is a Continuation of U.S. application Ser. No. 12/985,787, filed Jan. 6, 2011, which issued as U.S. Pat. No. 8,417,914, on Apr. 9, 2013, the specifications of which are included by reference.

TECHNICAL FIELD

The present disclosure relates generally to semiconductor memory devices, methods, and systems, and more particularly, to memory address translation.

BACKGROUND

Memory devices are typically provided as internal, semiconductor, integrated circuits and/or external removable devices in computers or other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Flash memory devices can be utilized as volatile and non-volatile memory for a wide range of electronic applications. Flash memory devices typically use a one-transistor memory cell that allows for high memory densities, high reliability, and low power consumption. Flash memory devices often may have a "NAND" or "NOR" memory array architecture, so called for the logical form in which the basic memory cell configuration of each is arranged. Uses for flash memory include memory for solid state drives (SSDs), personal computers, personal digital assistants (PDAs), digital cameras, cellular telephones, portable music players (e.g., MP3 players), and movie players, among other electronic devices. Data, such as program code, user data, and/or system data, such as a basic input/output system (BIOS), are typically stored in flash memory devices.

A flash memory device may include a flash transition layer (FTL). An FTL can be used (e.g., during a programming operation performed on the flash memory device) to map a logical address associated with a data entry to a physical address in the flash memory. An FTL may include an address mapping table in the local memory of the flash memory device to perform the mapping operation. However, the size of (e.g., the amount of data stored in) address mapping tables used in previous FTL approaches may be fixed. Because the size of address mapping tables used in previous FTL approaches may be fixed, address mapping tables used in previous FTL approaches may not be adaptable to different types of flash memory devices. That is, previous FTL approaches may be used in only one type of flash memory device.

DETAILED DESCRIPTION

Figure 1:
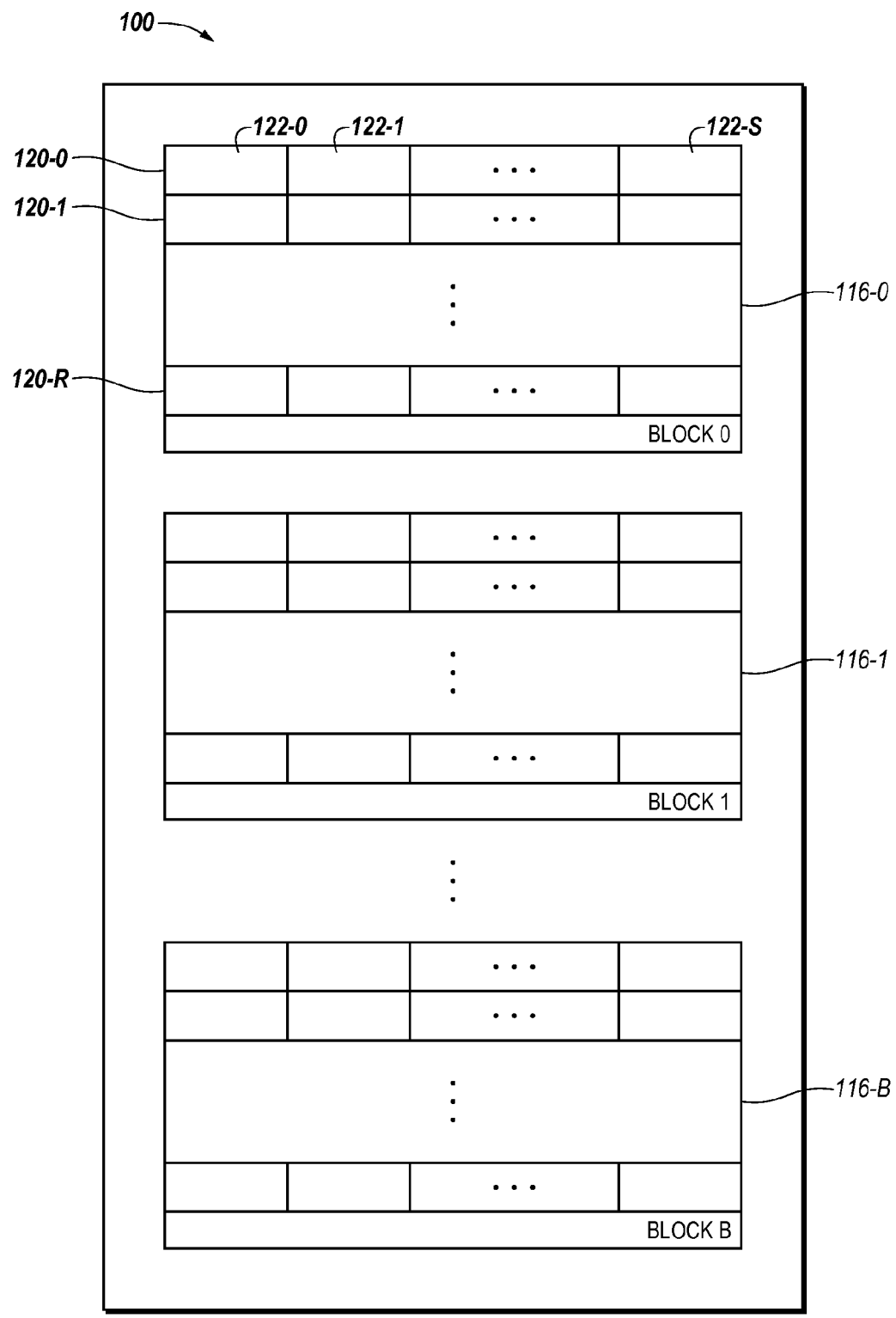
FIG. 1 illustrates a diagram of a portion of a memory array having a number of physical blocks in accordance with one or more embodiments of the present disclosure.

The present disclosure includes devices, systems, and methods for memory address translation. One or more embodiments include a memory array and a controller coupled to the array. The array includes a first table having a number of records, wherein each record includes a number of entries, wherein each entry includes a physical address corresponding to a data segment stored in the array and a logical address. The controller includes a second table having a number of records, wherein each record includes a number of entries, wherein each entry includes a physical address corresponding to a record in the first table and a logical address. The controller also includes a third table having a number of records, wherein each record includes a number of entries, wherein each entry includes a physical address corresponding to a record in the second table and a logical address.

Embodiments of the present disclosure can include flash translation layers having tables (e.g., address mapping tables) that have variable sizes. That is, the size of (e.g., the amount of data stored in) the tables in flash translation layers of the present disclosure can change. Because the size of the tables in flash translation layers of the present disclosure can change, the tables may be adaptable to different types of flash memory devices. That is, flash translation layers in accordance with the present disclosure may be used in different types of flash memory devices.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of tables can refer to one or more tables. Additionally, the designators "B", "D", "E", "R", and "S" as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 232 may reference element "32" in FIG. 2, and a similar element may be referenced as 332 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a diagram of a portion of a memory array 100 having a number of physical blocks in accordance with one or more embodiments of the present disclosure. Memory array 100 can be, for example, a NAND or NOR flash non-volatile memory array. However, embodiments of the present disclosure are not limited to a particular type of memory array. Further, although not shown in FIG. 1, one of ordinary skill in the art will appreciate that memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be single level cells and/or multilevel cells. As an example, the number of physical blocks in memory array 100 may be 128 blocks, 512 blocks, or 1,024 blocks, but embodiments are not limited to a particular multiple of 128 or to any particular number of physical blocks in memory array 100.

In the example shown in FIG. 1, each physical block 116-0, 116-1, . . . , 116-B includes memory cells which can be erased together as a unit (e.g., the cells in each physical block can be erased in a substantially simultaneous manner). For instance, the memory cells in each physical block can be erased together in a single erase operation.

As shown in FIG. 1, each physical block 116-0, 116-1, . . . , 116-B contains a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block.

As one of ordinary skill in the art will appreciate, each row 120-0, 120-1, . . . , 120-R can include (e.g., store) one or more physical pages of data. A physical page refers to a unit of programming and/or sensing (e.g., a number of cells that are programmed and/or sensed together as a functional group of memory cells). In the embodiment shown in FIG. 1, each row 120-0, 120-1, . . . , 120-R stores one page of data. However, embodiments of the present disclosure are not so limited. For instance, in one or more embodiments of the present disclosure, each row can store multiple pages of data, with one or more even pages of data associated with even-numbered bit lines, and one or more odd pages of data associated with odd numbered bit lines. Additionally, for embodiments including multilevel cells, a physical page can be logically divided into an upper page and a lower page of data, with each cell in a row contributing one or more bits towards an upper page of data and one or more bits towards a lower page of data. In one or more embodiments, a memory array can include multiple physical blocks of memory cells and each physical block can be organized into multiple pages.

In one or more embodiments of the present disclosure, and as shown in FIG. 1, a page associated with a row can store data (e.g., after a programming operation) in accordance with a number of physical sectors 122-0, 122-1, . . . , 122-S. Each physical sector 122-0, 122-1, . . . , 122-S can store data that corresponds to one or more logical sectors of data. For example, a particular physical sector (e.g., data stored in the particular physical sector) can correspond to a particular logical sector. Additionally, a portion of data stored in one or more physical sectors can correspond to a particular logical sector. For example, a first portion of data stored in a particular physical sector can correspond to a first logical sector, and a second portion of data stored in the particular physical sector can correspond to a second logical sector. Each physical sector 122-0, 122-1, . . . , 122-S, can also store system and/or user data, and can include overhead information, such as error correction code (ECC) information and logical block address (LBA) information.

Each physical sector 122-0, 122-1, . . . , 122-S can have a physical address, such as, for example, a physical block number (PBN), associated therewith. The PBN of a physical sector can identify the actual physical location of the sector within memory array 100. For example, a PBN can identify a CE#, LUN, plane, block, page, position, and/or status. Further, a number of PBNs can map onto a physical page of memory cells in memory array 100. For example, one, two or four PBNs can map onto a physical page, depending on what the type of memory array 100 is.

As one of ordinary skill in the art will appreciate, logical block addressing is a scheme that can be used by a host for identifying a logical sector of data. For example, each logical sector can correspond to a unique logical block address (LBA). Additionally, an LBA may also correspond to a physical address. As an example, a logical sector of data can be a number of bytes of data (e.g., 256 bytes, 512 bytes, or 1,024 bytes). However, embodiments are not limited to these examples.

In one or more embodiments of the present disclosure, a number of LBAs can correspond to a logical page number (LPN). That is, an LPN can include a number of LBAs (e.g., a number of logical sectors of data). For example, one or more LPNs can map logically into one LBA, depending on the size of the LBA and/or LPN(s). Additionally, a virtual page number (VPN) can be used to identify the logical address (e.g., map the location) of data stored in a table, such as, for example, tables 232, 236, 242, 332, 438, and/or 542 further described herein in connection with FIGS. 2A-5. That is, a VPN can be the equivalent of an LPN for data stored in a table.

It is noted that other configurations for the physical blocks 116-0, 116-1, . . . , 116-B, rows 120-0, 120-1, . . . , 120-R, sectors 122-0, 122-1, . . . , 122-S, and pages are possible. For example, rows 120-0, 120-1, . . . , 120-R of physical blocks 116-0, 116-1, . . . , 116-B can each store data corresponding to a single logical sector which can include, for example, more or less than 512 bytes of data.

Figure 2A:
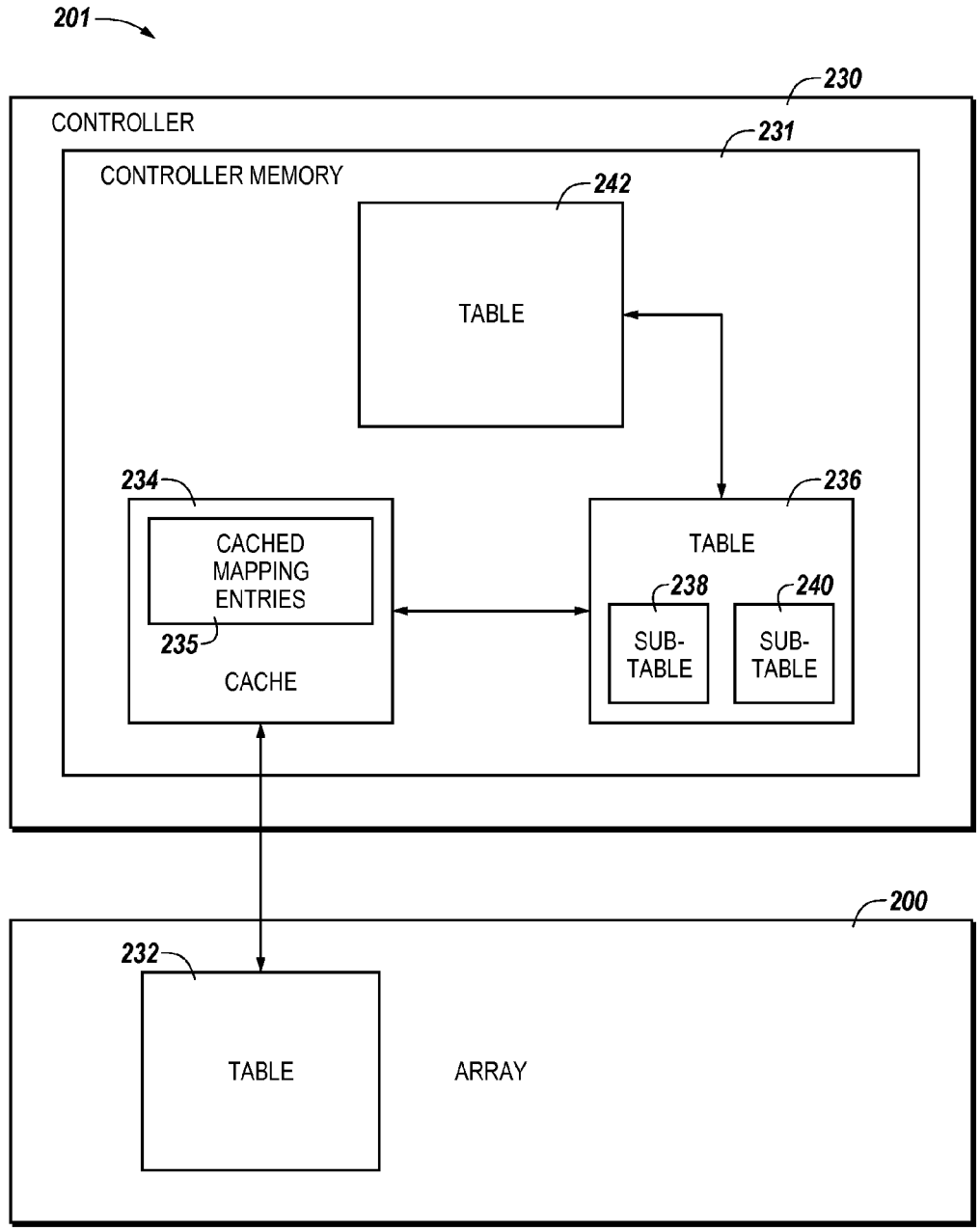
FIG. 2A illustrates a block diagram of a memory device in accordance with one or more embodiments of the present disclosure.

FIG. 2A illustrates a block diagram of a memory device 201 in accordance with one or more embodiments of the present disclosure. As shown in FIG. 2A, memory device 201 includes a memory array 200 and a controller 230 coupled to (e.g., in communication with) memory array 200.

Memory array 200 can be, for example, memory array 100 previously described in connection with FIG. 1. Although one memory array is shown in FIG. 2A, embodiments of the present disclosure are not so limited (e.g., memory device 201 can include more than one memory array coupled to controller 230).

As shown in FIG. 2A, controller 230 includes a controller memory 231. Controller memory 231 can be, for example, static random access memory (SRAM), among other types of memory. Controller 230 can also include, for example, control circuitry and/or firmware, and can be included on the same physical device (e.g., the same die) as memory array 200, or can be included on a separate physical device that is communicatively coupled to the physical device that includes memory array 200.

In the embodiment illustrated in FIG. 2A, memory device 201 includes three tables (e.g., tables 232, 236, and 242). Tables 232, 236, and 242 (e.g., data stored in tables 232, 236, and 242) can be part of a demand-based flash translation layer, as will be further described herein. For instance, tables 232, 236, and 242 can be used to map a logical address (e.g., an LBA provided by a host) associated with a number of memory cells in memory array 200 to a physical address (e.g., a PBN) associated with the memory cells, as will be further described herein.

Tables 232, 236, and 242 can be, for example, a data block lookup table, a global directory lookup table, and a root directory lookup table, respectively. Table 232 is located (e.g., stored) in memory array 200, as shown in FIG. 2A. Tables 236 and 242 are located in controller 230 (e.g., in controller memory 231), as shown in FIG. 2A. Tables 232, 236, and 242 can include a number of logical to physical address mappings, as will be further described herein.

Table 232 can include a number of records. Each record in table 232 can include a number of entries, and each entry in a record can include a physical address (e.g., a PBN) corresponding to a data segment (e.g., a sector of data) stored in memory array 200 and a logical address (e.g., an LPN). That is, each entry in table 232 can include a mapping of an LPN to a PBN. The records and entries in table 232 will be further described herein (e.g., in connection with FIG. 3).

As shown in FIG. 2A, controller 230 (e.g., controller memory 231) includes a cache 234 coupled to table 232. Cache 234 includes cached mapping entries 235. Cache 234 (e.g., cached mapping entries 235) can store one or more of the number of records in table 232. In various embodiments, the one or more records stored in cache 234 can be active records of table 232 that are temporarily stored in cache 234. The determination of whether a record in table 232 is currently included in cache 234 (e.g., of whether a record in table 232 is currently active) can be based on, for example, whether an entry in the record is currently being used (e.g., by an application) and/or has previously been used to determine a physical address of a particular data segment in memory array 200. For instance, the determination of whether a record in table 232 is to be included in and/or removed from cache 234 can be made using a least recently used (LRU) or segmented LRU algorithm. Embodiments of the present disclosure, however, are not limited to a particular type of algorithm.

For example, the one or more records in cache 234 can be records in table 232 having an entry most recently used to determine a physical address of a particular data segment in memory array 200. That is, no record in table 232 that is not also currently in cache 234 may have an entry that has been used to determine a physical address of a particular data segment in memory array 200 more recently than a record in table 232 that is also currently in cache 234. Additionally and/or alternatively, the one or more records in cache 234 can be records in table 232 having an entry previously used at least twice to determine a physical address of a particular data segment in memory array 200.

As shown in FIG. 2A, table 236 is coupled to cache 234 and includes two sub-tables (e.g., sub-tables 238 and 240). Sub-table 238 can include a number of records, and sub-table 240 can include an additional number of records. Each record in sub-table 238 can include a number of entries, and each entry in a record in sub-table 238 can include a physical address (e.g., a PBN) corresponding to a record in table 232 and a logical address (e.g., a VPN). Each record in sub-table 240 can include a number of entries, and each entry in a record in sub-table 240 can include a physical address (e.g., a PBN) corresponding to a record in cache 234 and a logical address (e.g., a VPN). That is, each entry in sub-tables 238 and 240 can include a mapping of a VPN to a PBN. The records and entries in table 236 (e.g., in sub-tables 238 and 240) will be further described herein (e.g., in connection with FIG. 4).

Although not illustrated in FIG. 2A, a copy of sub-table 238 can be stored in memory array 200 as a backup (e.g., as a guard against an unexpected loss of power). In contrast, a copy of sub-table 240 may not be stored in memory array 200, because sub-table 240 maps records in cache 234 and hence may not be affected by an unexpected loss of power.

As shown in FIG. 2A, table 242 is coupled to table 236. Table 242 can include a number of records. Each record in table 242 can include a number of entries, and each entry can include a physical address (e.g., a PBN) corresponding to a record in table 236 (e.g., in sub-table 238 and/or sub-table 240) and a logical address (e.g., a VPN). That is, each entry in table 242 can include a mapping of a VPN to a PBN. The records and entries in table 242 will be further described herein (e.g., in connection with FIG. 5). Additionally, although not illustrated in FIG. 2A, a copy of table 242 can be stored in memory array 200 as a backup.

In one or more embodiments of the present disclosure, tables 232, 236, and/or 242 can have a variable size. That is, the size of (e.g., the amount of data stored in) tables 232, 236, and/or 242 can change. Because the size of tables 232, 236, and/or 242 can change, tables 232, 236, and/or 242 may be adaptable to different types of flash memory devices. That is, flash translation layers having tables 232, 236, and 242 may be used in different types of flash memory devices.

Additionally, table 232 can have a smaller size than memory array 200, table 236 can have a smaller size than table 232, and table 242 can have a smaller size than table 236. For example, the ratio of the size of table 232 to the size of memory array 200 can be approximately 1 to 1000, table 236 can be approximately three orders of magnitude smaller than table 232, and table 242 can be approximately three orders of magnitude smaller than table 236. However, embodiments of the present disclosure are not limited to a particular size relationship between memory array 200 and tables 232, 236, and 242.

Although the embodiment illustrated in FIG. 2A includes three tables (e.g., tables 232, 236, and 242), embodiments of the present disclosure are not limited to a particular number of tables. For example, embodiments of the present disclosure can include one or more additional tables (not shown in FIG. 2A), in addition to tables 232, 236, and 242, as part of a demand-based flash translation layer. For instance, controller 230 (e.g., controller memory 231) can also include one or more additional tables (not shown in FIG. 2A), in addition to tables 236 and 242, that are analogous to tables 236 and/or 242.

The embodiment illustrated in FIG. 2A can also include additional circuitry that is not illustrated so as not to obscure embodiments of the present disclosure. For example, memory device 201 can include address circuitry to latch address signals provided over I/O connectors through I/O circuitry. Address signals can be received and decoded by a row decoder and a column decoder, to access memory array 200. It will be appreciated by those skilled in the art that the number of address input connectors can depend on the density and architecture of memory device 201 and/or memory array 200.

Figure 2B:
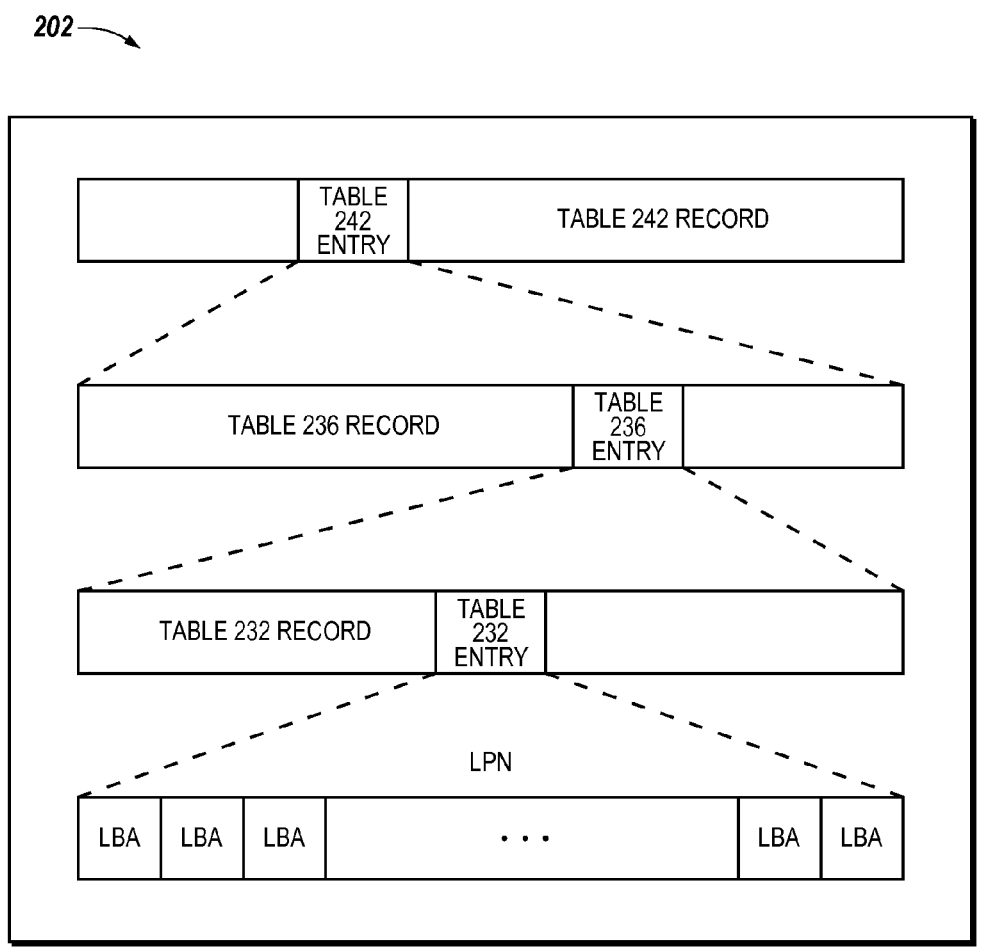
FIG. 2B is a diagram illustrating the relationship between a number of tables in accordance with one or more embodiments of the present disclosure.

FIG. 2B is a diagram 202 illustrating the relationship between tables 232, 236, and 242. As illustrated in FIG. 2B, an entry in a record of table 242 that corresponds to a logical address (e.g., an LBA) corresponding to a particular data segment (e.g., a particular sector of data) in memory array 200 can be determined based on a given logical address received from a host. Using the determined entry in table 242, a physical address (e.g., a PBN) corresponding to a record in table 236 (e.g., in sub-table 238 and/or sub-table 240) and a logical address (e.g., a VPN) can be determined, as illustrated in FIG. 2B.

As illustrated in FIG. 2B, an entry in the record in table 236 corresponding to the logical address corresponding to the data segment in memory array 200 can then be determined. That is, an entry in sub-table 238 and/or sub-table 240 corresponding to the logical address corresponding to the data segment in memory array 200 can then be determined.

Using the determined entry in sub-table 238, a physical address (e.g., a PBN) corresponding to a record in table 232 and a logical address (e.g., a VPN) can be determined, as illustrated in FIG. 2B. That is, in the embodiment illustrated in FIG. 2B, the determined entry in the record in table 236 is an entry in sub-table 238. Additionally and/or alternatively, in embodiments in which the determined entry in the record in table 236 is an entry in sub-table 240, a physical address (e.g., a PBN) corresponding to a record in cache 234 and a logical address (e.g., a VPN) can be determined using the determined entry in sub-table 240.

As illustrated in FIG. 2B, an entry in the record in table 232 corresponding to the logical address corresponding to the data segment in memory array 200 can then be determined. Additionally and/or alternatively, in embodiments in which a physical address corresponding to a record in cache 234 is determined, an entry in the record in cache 234 corresponding to the logical address corresponding to the data segment in memory array 200 can then be determined.

Using the determined entry in table 232, a physical address (e.g., a PBN) corresponding to the data segment in memory array 200 and a logical address (e.g., an LPN) can be determined, as illustrated in FIG. 2B. Additionally and/or alternatively, in embodiments in which an entry in the record in cache 234 is determined, the physical address corresponding to the data segment in memory array 200 and a logical address can be determined using the determined entry in cache 234. Data of the data segment then be accessed using the determined physical address.

Figure 3:
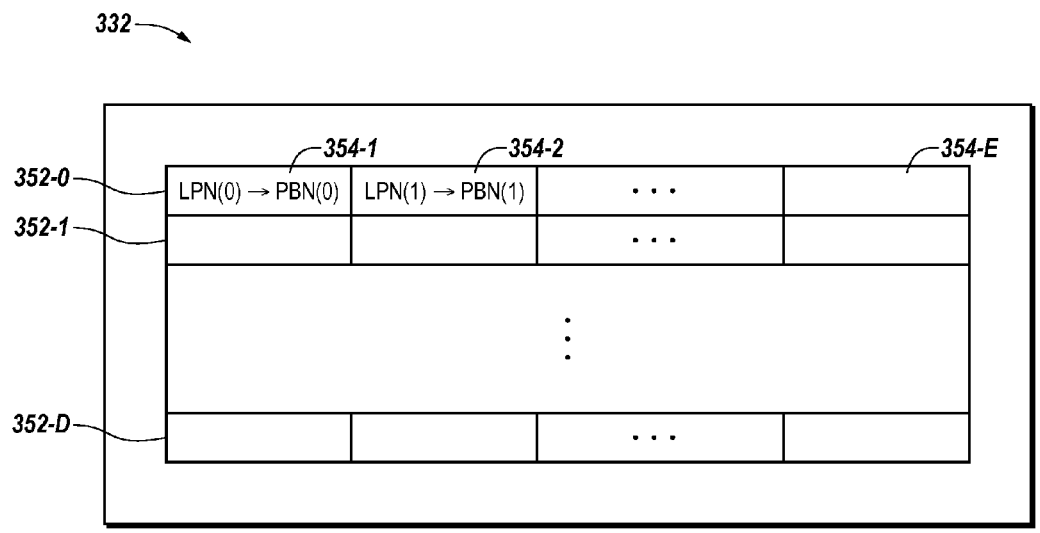
FIG. 3 illustrates a diagram of a portion of a table in accordance with one or more embodiments of the present disclosure.

FIG. 3 illustrates a diagram of a portion of table 332 in accordance with one or more embodiments of the present disclosure. Table 332 can be, for example, table 232 previously described in connection with FIG. 2A.

As shown in FIG. 3, table 332 includes a number of records 352-0, 352-1, ..., 352-D. Each record 352-0, 352-1, ..., 352-D includes a number of entries 354-1, 354-2, ..., 354-E. Each entry 354-1, 354-2, ..., 354-E in a record 352-0, 352-1, ..., 352-D can include, for example, a mapping of a logical page number (LPN) to a physical block number (PBN), as shown in FIG. 3. The PBN can correspond to a particular data segment in a memory array (e.g., memory array 200 previously described in connection with FIG. 2A). Additionally, each entry 354-1, 354-2, ..., 354-E in a record 352-0, 352-1, ..., 352-D can be logically addressed based on a linear mapping of logical page numbers (LPNs) associated with the memory array. For example, as shown in FIG. 3, entry 354-1 in record 352-0 can include the PBN corresponding to the data segment associated with the LPN for the first logical page of memory cells in the memory array, entry 354-2 in record 352-1 can include the PBN corresponding to the data segment associated with the LPN for the second logical page of memory cells in the memory array, etc.

Additionally, each record 352-0, 352-1, ..., 352-D can include a link configured to incorporate the record into cache 234 previously described in connection with FIG. 2A. For example, the link can be a position holder that can enable a transfer of the record into cache 234 to occur without manipulating the record. After the record is transferred into cache 234 (e.g., while the record is stored in cache 234), the link can correspond to a memory address, such as, for example, a logical and/or physical address in cache 234 and/or table 332.

Figure 4:
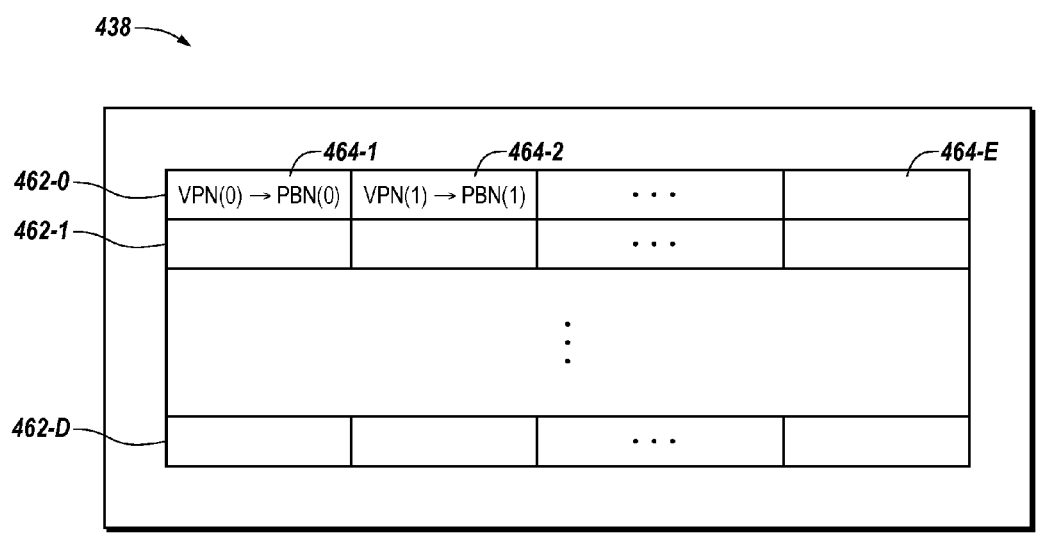
FIG. 4 illustrates a diagram of a portion of a sub-table in accordance with one or more embodiments of the present disclosure.

FIG. 4 illustrates a diagram of a portion of sub-table 438 in accordance with one or more embodiments of the present disclosure. Sub-table 438 can be, for example, sub-table 238 previously described in connection with FIG. 2A.

As shown in FIG. 4, sub-table 438 includes a number of records 462-0, 462-1, ..., 462-D. Each record 462-0, 462-1, ..., 462-D includes a number of entries 464-1, 464-2, ..., 464-E. Each entry 464-1, 464-2, ..., 464-E in a record 462-0, 462-1, ..., 462-D can include, for example, a mapping of a virtual page number (VPN) to a physical block number (PBN), as shown in FIG. 4. The PBN can correspond to a particular record in table 332 previously described in connection with FIG. 3. Additionally, each entry 464-1, 464-2, ..., 464-E in a record 462-0, 462-1, ..., 462-D can be logically addressed based on a linear mapping of the VPNs associated with table 332. For example, as shown in FIG. 4, entry 464-1 in record 462-0 can include the PBN associated with the VPN for record 352-0 in table 332, entry 464-2 in record 462-0 can include the PBN associated with the VPN for record 352-1 in table 332, etc.

Each entry 464-1, 464-2, ..., 464-E in a record 462-0, 462-1, ..., 462-D can have a one-to-one correspondence with an entry in sub-table 240 previously described in connection with FIG. 2A. For example, each entry in sub-table 240 can be analogous to an entry 464-1, 464-2, ..., 464-E in a record 462-0, 462-1, ..., 462-D, except that each entry in sub-table 240 can include a mapping of a VPN to a PBN corresponding to a particular record in cache 234 previously described in connection with FIG. 2A, and each entry in sub-table 240 can be logically addressed based on a linear mapping of the VPNs associated with cache 234.

Additionally, an entry in sub-table 240 may only be valid if the record in table 332 mapped by the entry is also concurrently stored in cache 234. For example, when a record in table 332 is removed from cache 234, the entry in sub-table 240 used to map the record in cache 234 can be invalidated, and the entry in sub-table 438 used to map the record in table 332 can be updated.

Figure 5:
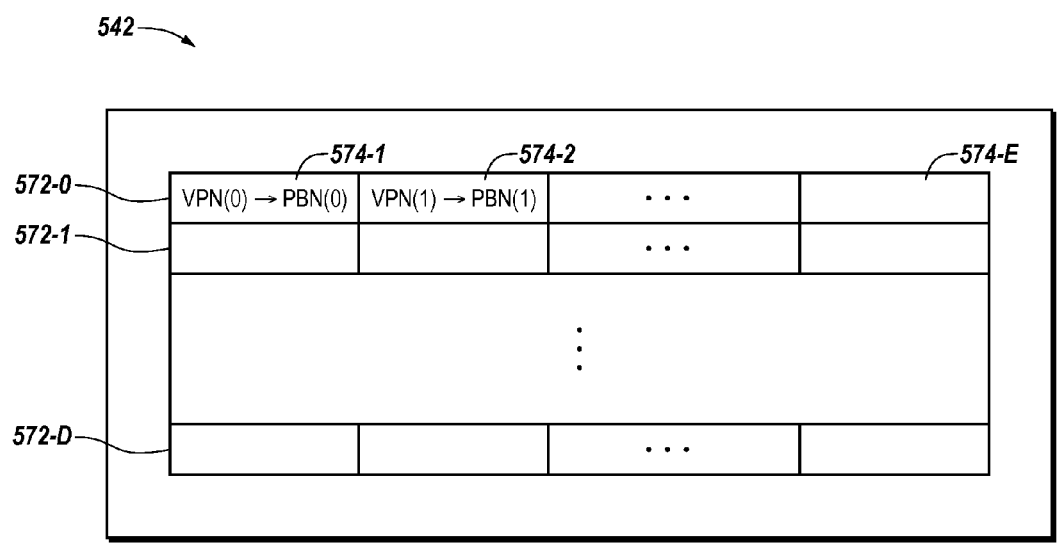
FIG. 5 illustrates a diagram of a portion of a table in accordance with one or more embodiments of the present disclosure.

FIG. 5 illustrates a diagram of a portion of table 542 in accordance with one or more embodiments of the present disclosure. Table 542 can be, for example, table 242 previously described in connection with FIG. 2A.

As shown in FIG. 5, table 542 includes a number of records 572-0, 572-1, ..., 572-D. Each record 572-0, 572-1, ..., 572-D includes a number of entries 574-1, 574-2, ..., 574-E. Each entry 574-1, 574-2, ..., 574-E in a record 572-0, 572-1, ..., 572-D can include, for example, a mapping of virtual page number (VPN) to a physical block number (PBN), as shown in FIG. 5. The PBN can correspond to a particular record in sub-table 438 previously described in connection with FIG. 4. Additionally, each entry 574-1, 574-2, ..., 574-E in a record 572-0, 572-1, ..., 572-D can be logically addressed based on a linear mapping of the VPNs associated with sub-table 438. For example, as shown in FIG. 5, entry 574-1 in record 572-0 can include the PBN associated with the VPN for record 462-0 in sub-table 438, entry 574-2 in record 572-0 can include the PBN associated with the VPN for record 462-1 in sub-table 438, etc.

CONCLUSION

The present disclosure includes devices, systems, and methods for memory address translation. One or more embodiments include a memory array and a controller coupled to the array. The array includes a first table having a number of records, wherein each record includes a number of entries, wherein each entry includes a physical address corresponding to a data segment stored in the array and a logical address. The controller includes a second table having a number of records, wherein each record includes a number of entries, wherein each entry includes a physical address corresponding to a record in the first table and a logical address. The controller also includes a third table having a number of records, wherein each record includes a number of entries, wherein each entry includes a physical address corresponding to a record in the second table and a logical address.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory device, comprising:
  a memory array including a first table having a first number of records, wherein each of the first number of records includes a second number of entries; and
  a controller coupled to the array and including:
    a second table having a first number of records, wherein each of the first number of records in the second table includes a second number of entries; and
    a third table having a first number of records, wherein each of the first number of records in the third table includes a second number of entries, and wherein each of the second number of entries in each of the first number of records in the third table includes a physical address corresponding to a record in the second table.

2. The memory device of claim 1, wherein each of the second number of entries in each of the first number of records in the first table includes a physical address corresponding to a data segment stored in the memory array.

3. The memory device of claim 1, wherein each of the second number of entries in each of the first number of records in the first table includes a logical address.

4. The memory device of claim 1, wherein each of the second number of entries in each of the first number of records in the second table includes a physical address corresponding to a record in the first table.

5. The memory device of claim 1, wherein at least one of the first table and the second table have a variable size.

6. The memory device of claim 1, wherein the controller includes a cache configured to store one or more of the first number of records of the first table.

7. A memory device, comprising:
  a memory array including a first table having a first number of records; and
  a controller coupled to the memory array and including:
    a second table having a second number of records, wherein the second table includes:
      a first sub-table having a first number of records, wherein each of the first number of records in the first sub-table includes a second number of entries; and
      a second sub-table having a first number of records, wherein each of the first number of records in the second sub-table includes a second number of entries; and
    a third table;
  wherein at least one of the first table and the second table have a variable size.

8. The memory device of claim 7, wherein the third table has a variable size.

9. The memory device of claim 7, wherein the first table and the second table have a variable size.

10. A method of operating a memory device, comprising:
  determining an entry in a record of a first table in a controller of the memory device;
  determining, using the determined entry, an entry in a record of a second table in a memory array of the memory device;
  determining an entry in a record of a third table in the controller of the memory device, wherein the determined entry in the record of the third table includes a physical address corresponding to the record of the first table; and
  determining, using the determined entry in the record of the third table, the entry in the record of the first table.

11. The method of claim 10, wherein the method includes changing a size of at least one of the first table and the second table.

12. The method of claim 10, wherein the determined entry in the record of the third table corresponds to a logical address corresponding to a data segment stored in the memory array.

13. The method of claim 10, wherein the method includes storing the record of the second table in the controller.

14. The method of claim 10, wherein the method includes accessing a data segment stored in the memory array using the determined entry in the record of the second table.

* * * * *